May 28, 1968 E. FRYDMAN 3,386,056

ELECTRICAL SWITCH MODULE

Filed Aug. 26, 1966

United States Patent Office 3,386,056
Patented May 28, 1968

3,386,056

ELECTRICAL SWITCH MODULE

Emanuel Frydman, London, England, assignor to Telephone Manufacturing Company Limited, London England Filed Aug. 26, 1966, Ser. No. 575,389
Claims priority, application Great Britain, Sept. 13, 1965, 38,943/65
6 Claims. (Cl. 335—112)

ABSTRACT OF THE DISCLOSURE

An electrical switch module for electrical and mechanical connection to other modules contains a plurality of individual switches in the form of reed type relays incased within glass tubes located within an operating coil which is housed in a rectangular casing. Support bases at the opposite ends of the casing carry a plurality of conductors connected to the relays, these conductors extending transversely to, and which terminate beyond opposite sides of, the casing in tags so that the tags on one switch module can be mechanically and electrically connected to corresponding and overlapping tags on an adjacent module by wire wrapping. The conductor-supporting bases are carried by end plates for the module casing which can be selectively oriented by 90° so as to enable the transversely extending conductors at opposite ends of the casing to be mutually perpendicular or parallel.

Figure 1:
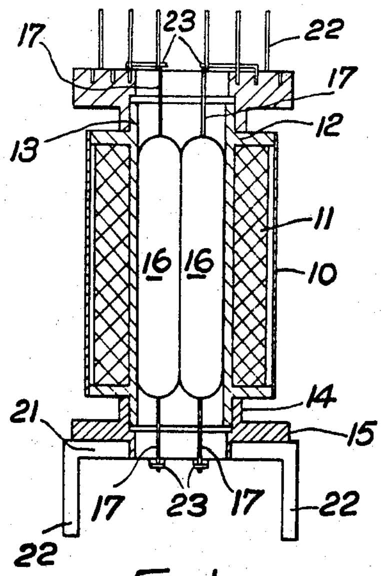

The present invention relates to electrical devices and circuit arrangements and in particular to a multiple wiring arrangement for interconnecting individual devices of an array of identical devices such as may be used for example in co-ordinate switching arrays employing reed relays as the cross-point switches.

In co-ordinate switching arrays employing reed relay cross-point switches the individual switches are assembled together and mechanically interlinked to form a unitary whole, with terminal tags for making the necessary common and individual connections arranged to facilitate the attachment thereto of multipling wires. Such multipling wires or "commons" are then soldered to corresponding tags of the devices of the array to connect them in rows and columns.

In one known form of such array the wiring in rows is effected on one face of the array and the wiring in columns on the opposite face and if it should become necessary to remove and replace a switch in the completed array it is necessary to disconnect all the common leads connected to such one switch from all the other switches in the same row and all the other switches in the same column before the one switch is free to be mechanically disconnected from the array and replaced. All the wires so removed have then to be re-attached to all the relevant row and column switches before the array is ready to resume services.

This difficulty of replacement of a single switch in a large array occurs in any arrangement wherein external multipling wires extend across the face or faces of the array no matter what form the switches themselves may take but it presents a particular disadvantage in the case of a switching array employing as cross-point switches units which each comprise four reed contact assemblies mounted in a common housing and wherein the failure of only one of the four contact assemblies may occasion the dismantling of the multipling arrangements of one whole column and one whole row to enable replacement to take place.

The present invention largely overcomes the aforementioned difficulty and disadvantage by avoiding the use of external multipling wires which require connection to each of the devices they connect in multiple and further presents the possibility of doing away with mechanical interlinking of the individual switches or switch modules of an array as a separate provision additional to the electrical interlinking provided.

The invention contemplates an electrical switch module or unit, for assembly with other identical units in a co-ordinate array, carrying on at least one of its end faces conductors extending across such face and presenting tags at opposite sides of such face in such a manner than when two such units are arranged side by side corresponding tags lie in close adjacence and can readily be interconnected to form multipling connections extending across the faces of both units. The interconnecting of the tags conveniently also serves to link the units together mechanically and where an array of such units are linked horizontally across one face of the array in this manner and similarly linked vertically across the opposite face of the array no further mechanical interlinking of the units is necessary and the array may be mounted in a simple rectangular support frame as an integral unit.

It will readily be appreciated that in order to remove, for maintenance or replacement, one switch unit from an array formed in this manner it is only necessary to disconnect the connections between that switch unit and its immediately adjacent ones in the same row and in the same column to free the unit both electrically and mechanically. Moreover where only one reed contact assembly of the four in a reed relay type cross-point switch unit requires replacement it is only necessary to disconnect the electrode wires of the reed assembly in question from the conductors to which it is attached at opposite ends of the switch unit, without disconnecting any of the multipling connections, in order to free such assembly for withdrawal from its switch unit.

Figure 2:
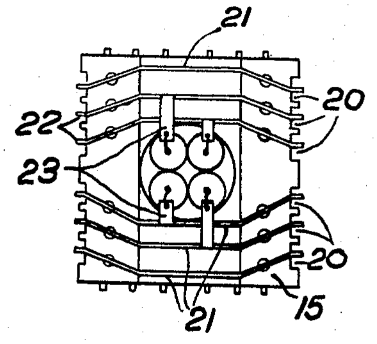
Figure 3:
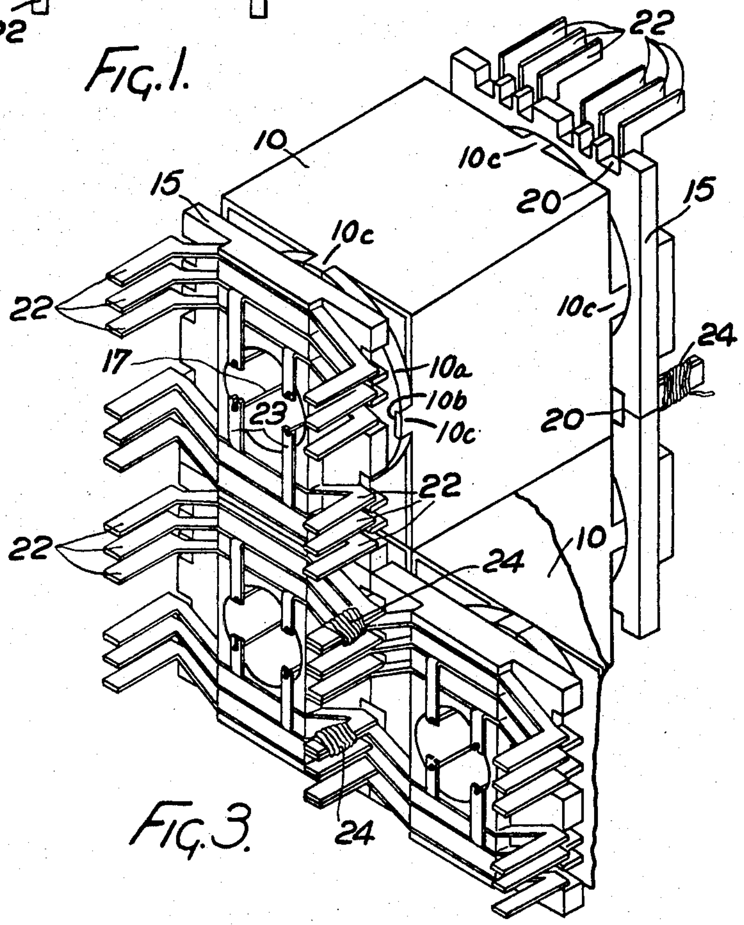

The various features and advantages of the invention will be apparent from the following description of an exemplary embodiment thereof using reed relay switch units taken in conjunction with the accompanying drawings in which:

FIGURES 1 and 2 are respectively a sectional view and an end view of a reed relay cross-point switch module in accordance with the invention, FIGURE 3 shows a plurality of the switch modules of FIGURES 1 and 2 assembled together to form part of a co-ordinate array.

Referring first to FIGURES 1 and 2 the cross-point switch module there shown comprises a square section casing 10 of magnetic shielding material housing an operating coil 11 wound on a former 12 the cheeks of which have short tubular extensions 13 on which fit collars 14 integral with terminal tag support bases 15. Inside the bore of former 12 are received four reed contact assemblies 16 in the former of glass tubes having end wires 17 projecting from opposite closed ends of the tubes.

Each support base 15 has a central aperture corresponding to the bore of former 12 and three spaced grooves running across its outer face on each side of the central aperture. Each groove ends in a rectangular notch 20 in the edge of base 15 and accommodates a flat metal terminal member 21 of a generally rectangular U shape with the base of the U cranked oppositely at two spaced points along its length so that the limbs of the U are offset to the same side of the plane containing the central part of the base of the U. These terminal members are received edgewise into the grooves in base supports 15 so that the limbs project normally from the major face of the supports 15 as terminal tags 22.

The length of the base portion of each U is such in relation to the side length of the square section of casing 10 that one half the width of each terminal tag 22 projects beyond the adjacent side face of the casing 10. The size of each of the notches 20 is preferably such that the whole width of each tag 22 stands clear of the material of the support 15.

The mounting of the terminal members on separate base supports instead of on the cheeks of former 13 allows the terminal members at one end to be oriented crosswise with respect to those at the other end or oriented parallel as desired simply by rotating one support relative to the other before the reed assemblies and coil terminations are connected. More particularly, as shown in the perspective view of FIG. 3, the support bases 15 are mounted upon end plates 10*a* of the casing 10, these end plates being provided with four notches 10*b* spaced 90° apart around the periphery which are arranged to engage locating lugs 10*c* which project from each of the four side walls of the casing. Thus, the support bases and the conductors 21 and their tabs 22 at opposite ends of casing 10 can be mounted parallel to one another, or perpendicular to one another, which is the particular arrangement depicted in FIG. 3.

The inner two of each group of three terminal members each have a lateral lug 23 intermediate its ends which projects over the ends of the bore in former 13 and is connected, for example by soldering, to a lead wire 17 of one of the reed assemblies within the bore after the supports 15 have been correctly positioned and secured against rotation by any suitable means.

Each of the terminal members 21 has two ears (not shown) at spaced points along the base of the U which pass through apertures in the supports 15 and are then twisted or bent over to retain the members in the grooves. The ears of the two outermost members of the groups of three, or one ear of each such outermost member serve the purpose of connecting the operating coil 11 to the terminal members.

It will be appreciated that where the facility of changing the relative orientation of the two supports 15 is not required separate supports can be dispensed with and the grooves and notches formed in the end cheeks of former 13.

Referring now to FIGURE 3, in forming a co-ordinate array of a plurality of the switch modules shown in FIGURES 1 and 2, the casings 10 of the switch modules are directly abutted so that the projecting tags 22 of one switch module overlap corresponding tags of the next adjacent switch modules in a horizontal row across one face of the array and the corresponding tags of the next adjacent switch modules in a vertical column across the opposite face of the array. The notches 20 along the edges of two adjacent supports 15 mate to define rectangular apertures behind each pair of overlapping terminal tags and these apertures serve to receive hold and insulate the lead ends of wire 24 which is wrapped around each overlapping pair of tags to connect adjacent switch modules together both mechanically and electrically. This wire wrapping can readily and speedily be effected by means of a wire wrapping gun and provides a good electrical and mechanical connection between the pairs of overlapping terminal tags.

It will be appreciated that whilst wire wrap connections such as have been described in connection with the illustrated embodiment form a simple and convenient means of electrical multiplying and mechanical connection, it is equally feasible to solder the overlapping tags together to interconnect them or to slip conductive sleeves over the pairs of tags to hold them together.

I claim:

1. An electrical switch module, for assembly with other identical modules in a co-ordinate array, said module having opposite end faces and carrying on each of such end faces a plurality of conductors extending across such end face and each presenting a terminal tag at each of two opposite sides of the end face on which such conductor is carried, the tags of the conductors at least in part projecting beyond said sides so that when two such modules are assembled in contacting side-by-side relation with their respective said end faces in the same plane, the tags at one side of one module overlap the tags at the adjacent side of the other module in close adjacency to each other to facilitate interconnection between the overlapping tags of the two modules, said module comprising a body portion with two end plates defining said end faces, at least one of said end plates being rotatably attached to said body portion so that the conductors carried by such end plate can be selectively oriented with respect to the conductors carried by the other end plate between positions in which the conductors at one end of the module are respectively parallel to and transverse to those at the opposite end of the module.

2. An electrical switch module as set forth in claim 1 wherein said body portion and end plates have therein registering central bores and said conductors have lateral extensions the free ends of which extend partly across the open ends of the bores in said end plates.

3. An electrical switch module as set forth in claim 2 wherein said body portion includes an operating coil surrounding the central bore therein, and at least one reed contact unit having end lead wires is positioned within said bore with its lead wires connected to one of said conductor lateral extensions at each end of said unit.

4. An electrical cross-point switch module as set forth in claim 3 having four said reed contact units positioned in the bore in said body portion with the lead wires at each end of the four contact units individually connected to separate conductor lateral extensions at each end face of the module.

5. An electrical switching array comprising a plurality of identical switching modules arranged in rows and columns, each of said modules having opposite end faces and carrying on each of said opposite end faces a plurality of conductors extending across such end face and each presenting a terminal tag at each of two opposite sides of the face on which such conductor is carried, the tags of the conductors on at least one side of an end face of each such module overlapping and being secured by conductive securing means to the tags at the adjacent side of the next module in each row and in each column, each said module further leaving a central bore extending between said opposite end faces and a plurality of reed contact units having end lead wires, said reed contact units being positioned in said bore with the end lead wires at opposite ends of such units connected to said conductors at opposite ends of said module, said securing means serving to interconnect adjacent modules both mechanically and electrically and as the multiplying connections of the array.

6. An electrical switching array as set forth in claim 5 wherein each said module is in the form of a flat sided rectangular block housing at least one operating coil for the reed contact units within said bore.

References Cited

UNITED STATES PATENTS

| | | | |
|---|---|---|---|
| 3,201,655 | 8/1965 | Bradt | 317—101 |
| 3,202,869 | 8/1965 | Matson | 317—100 |
| 3,293,502 | 12/1966 | Beierle | 335—152 |
| 3,302,068 | 1/1967 | Warman | 317—101 |

BERNARD A. GILHEANY, *Primary Examiner.*

H. BROOME, *Assistant Examiner.*